Dec. 27, 1960  A. C. LIND ET AL  2,966,268
METHOD AND APPARATUS FOR REMOVING SEDIMENT
Filed June 12, 1956  2 Sheets-Sheet 1

ARTHUR C. LIND
WILLIAM J. KATZ
INVENTORS

BY *Adrian L. Bateman, Jr.*

ATTORNEY

ARTHUR C. LIND
WILLIAM J. KATZ
INVENTORS

BY Adrian L. Bateman, Jr.

ATTORNEY

United States Patent Office 2,966,268
Patented Dec. 27, 1960

2,966,268

METHOD AND APPARATUS FOR REMOVING SEDIMENT

Arthur C. Lind, Wauwatosa, and William J. Katz, Fox Point, Wis., assignors to Chain Belt Company, Milwaukee, Wis., a corporation of Wisconsin Filed June 12, 1956, Ser. No. 590,940

6 Claims. (Cl. 210—83)

This invention relates generally to the removal of sediment from tanks in which liquid is held in a relatively quiescent state. More specifically, the invention relates to a method of and apparatus for removing sediments that characteristically collect in a relatively deep and thick, thixotropic sludge blanket at the bottoms of such tanks.

For a full and complete understanding of this invention it is necessary to have a concept of the behavior or of a sludge blanket containing sediment heavier than water which accumulates in a relatively thick layer adjacent the bottom of a tank. For the purpose of disclosure, and to simplify the description, numerous references are made hereafter of the well-known activated sludge process. It is to be understood that such references are illustrative only and the method and apparatus of the instant invention are useful in removing any sludge that accumulates in a relatively deep and thick blanket.

Individual particles of activated sludge are spongy, gelatinous matrices of bacteria which hold considerable liquid within their voids. In fact, the thickened solid content of activated sludge, as customarily removed from the bottom of final settling tanks by the most efficient methods, is usually less than 2%. Although it might be thought that a substance containing less than 2% solids should behave as a fluid, in the case of activated sludge and many other similar sludges, the accumulation of individual sludge particles in a sludge blanket produces behaviour very similar to a thixotropic system and not unlike freshly fallen snow. Thus, if a short, rectangular plow were to be forced through an activated sludge blanket, it would be found that a furrow would be cut which would have substantially straight upstanding sides as though the sludge were a solid form which a slice had been removed.

Further, it has been discovered, and is one aspect of this invention, that the speed at which a plow is moved through an activated sludge blanket is relatively critical, and if the speed be too great, sludge will pass upwardly over the plow and settle again immediately rearwardly of the plow as though the area had not been disturbed. Conversely, too, slow or inefficient removal of activated sludge, as is known, will permit the sludge to "bulk," that is to form gas within the sludge particles causing them to rise and mix with the clarified liquid standing thereabove and thereby defeat the operation of the activated sludge process.

Activated sludge has been removed from tank bottoms by plow type collectors which move the sludge to a sump from which it may be pumped. While such plow type removers are moderately effective, they inherently agitate the sludge as it is being plowed, and some remixing of sludge with clarified liquid inevitably occurs.

Suction headers have also been used for activated sludge removal, with considerable success. One such tuction header is disclosed in the patent to Townsend et al. No. 1,947,429, which comprises a header having a plurality of individual nozzles extending therefrom to sweep the area adjacent the tank floor, the header and nozzles operating at a lesser hydrostatic pressure than that existing in the bottom of the tank so that sludge will enter the nozzles and pass out through the header. With the Townsend et al. device it is necessary to sweep the entire area of the floor of the tank because the nozzles have a zone of influence limited to their openings. Thus, individual nozzles passing through a sludge blanket tend to cut individual furrows through the sludge blanket as described above, requiring further passes with nozzles staggered to sweep the areas not swept by the first pass.

It has also been proposed in Poole Patent No. 2,236,128 to remove sludge by means of a series of individual nozzles having slit-like openings which in the aggregate cover substantially the entire surface of the tank bottom in one pass or revolution. Poole likewise experienced difficulty in extending the zone of influence of his nozzle openings and provided a scraper following the nozzles to create a myriad of eddy currents in an attempt to dislodge individual particles from the sludge blanket to such an extent that they would come under the influence of his slit-like nozzle openings. Poole's scraper is not in sealing relationship to his eduction headers, however, and a substantial number of sludge particles, having been dislodged from the sludge blanket, are free to drift upwardly or rearwardly without eduction. This lowers the efficiency of the entire sedimentation process because, as it well known, a particle that has once settled becomes more difficult to settle a second time.

A similar solution has been proposed by Marshall, No. 2,168,264, in which double depending flanges straddle a series of ports in an attempt to create a zone of turbulence between the flanges whereby the ports may remove sediment dislodged therebetween. Such a device is necessarily limited in application to very shallow sludge blankets, and in an activated sludge blanket, for example, sludge would pass over the Marshall eductor, being deflected by the forwardmost depending flange.

The instant invention overcomes these shortcomings or prior sludge eductors, and in a simple, inexpensive unit provides an apparatus which will educt a relatively deep and/or thick sludge blanket in one pass, through a novel method of sludge fluidization.

According to the present invention, relatively thick thixotropic sludge blankets are educted from settling tanks by the combination of a ported casing having depending therefrom a fluidizing blade. Such an apparatus imparts kinetic mechanical energy to the sludge blanket sufficient to produce a fluid movement in the sludge blanket immediately adjacent the casing and blade, and while in motion, sludge is removed by eduction as it flows within the influence of ports in the casing adjacent the fluidizing blade, which ports are at a reduced hydrostatic pressure that urges the fluidized sludge to enter the ports and pass out through the casing.

Figure 1:
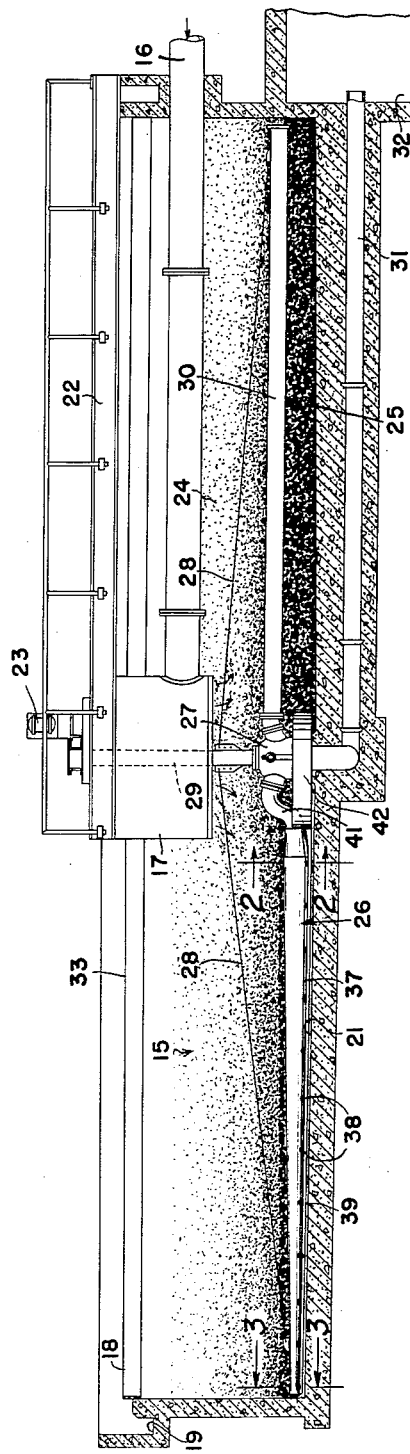
Fig. 1 is a cross section elevational view of a typical installation of a sediment eductor constructed in accordance with the present invention, shown in a circular tank.

Referring to the particulars of Fig. 1, clarification by sedimentation is accomplished in a tank 15, to which liquid is delivered through a conduit 16 and a central influent feed well 17. Clarified liquid is discharged from the upper portion of the tank 15 over a perimetric effluent weir 18 into an effluent launder 19, from whence the clarified liquid is discharged by a conduit not shown, while sediment settles to the lower portion of the tank. The tank 15 may be of concrete construction as shown, or in smaller sizes may be constructed of metal. The floor of the tank 21 is shown sloping downwardly slightly towards the center so that it may be drained for periodic cleaning. A bridge 22 is provided leading to the center of the tank for convenience in performing maintenance functions on the eductor driving means 23 located above feed well 17.

Liquid fed to the tank accumulates therein and is maintained in a relatively quiescent state whereby floc, or sediment particles 24 settle to the bottom portion of the tank forming a sludge blanket 25. In a typical activated sludge installation, the depth of the tank 15 may be fifteen feet, and the depth of the densest portion of sludge blanket 25 may be from two to three feet, it being understood that the density of the sludge blanket becomes progressively less from its lower to upper portions.

In the illustrated embodiment, a single sediment eduction casing 26 is mounted for rotation by driving means 23 upon a housing 27 journalled on the floor of the tank. The casing 26 is supported adjacent its outer end by means of cables 28 fixed to the shaft 29 of the driving means. In order to counterbalance the weight of casing 26, an elongated weight 30 is suspended diametrically opposite to casing 26 and is likewise supported by cables 28. If desired, multiple eduction casings may be used, in which event the weight 30 may be dispensed with and the casings arranged symmetrically about the header 27 in order to produce a balanced rotating structure. Sludge removed through the casing 26 passes through the open interior of housing 27 and is discharged beneath said housing through a discharge conduit 31 communicating with the housing and with a well 32. It will be apparent from the drawings that the difference in elevation of the well 32 and the top of the liquid surface 33 creates a hydrostatic pressure difference adjacent the outer portion of casing 26. Other well-known means for producing such pressure difference may be employed, such as siphons and pumps.

Figure 2:
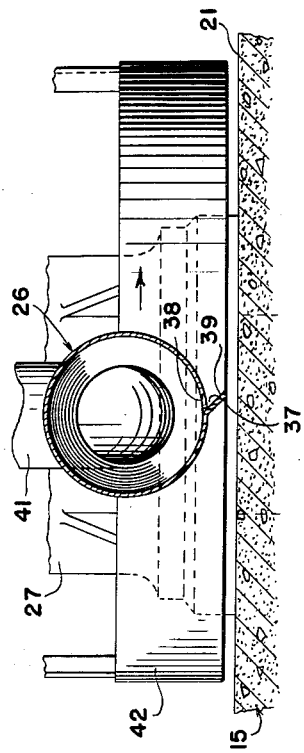
Fig. 2 is a cross section taken on the line 2—2 in Fig. 1 and showing the arrangement of the fluidizing blade with respect to one of the port adjacent the inner end of the casing.
Figure 3:
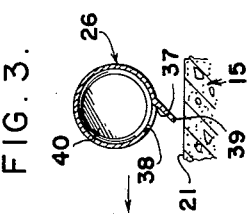
Fig. 3 is a section on the line 3—3 in Fig. 1 showing the arrangement of fluidizing blade and ports at the outer end of the casing.

As illustrated in Figs. 2 and 3, the casing 26 may be of tapered, circular or conical configuration for ease in construction, but it is to be understood that the particular shape or cross sectional contour of the casing is not of the essence of this invention, and in this connection attention is drawn to the application of our co-worker, Robert T. Steindorf, Serial No. 590,039, entitled "Sediment Eductors for Settling Chambers," filed concurrently herewith. Located along the lower surface of the casing are a series of ports 38 which are spaced apart a distance substantially greater than their axial lengthwise dimension and which may be displaced slightly forwardly of the vertical center line of the casing as shown in Fig. 2. Immediately rearwardly of the ports and projecting outwardly from the casing is a fluidizing blade 39 with its upper surface in sealing engagement with the casing and its lower surface arranged parallel to and spaced slightly from the floor 21 of the tank 15.

As illustrated in Figs. 2 and 3, the included angle between the forward wall (with reference to the direction of motion) of the casing and the fluidizing blade is acute. This produces a channel 37 along which fluidized sludge is urged to travel until it comes under the influence of a port 38. The included angle of this channel is dependent upon the properties of the sludge being removed, but it will generally be found preferable to give the blade 39 a forward rather than rearward rake angle with respect to the casing 26. At its outer end the casing 26 is closed by a plate 40 and at its inner end it is operatively connected with housing 27 by means of a reducing section 41.

Figure 4:
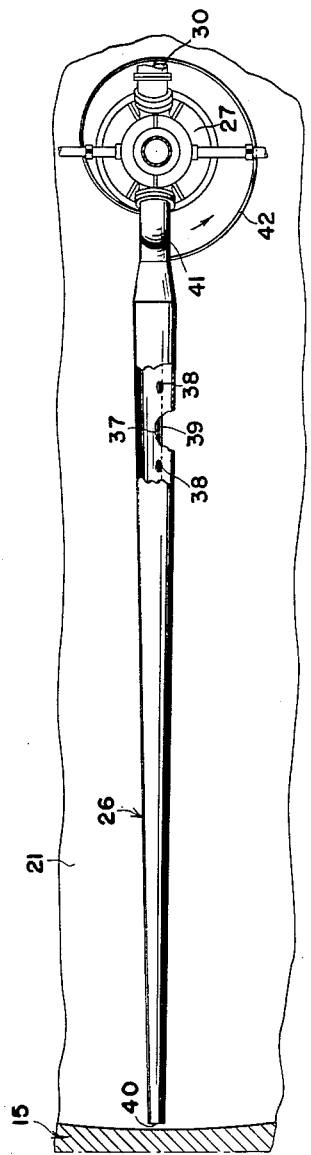
Fig. 4 is a plan view of a portion of the device shown in Fig. 1, broken away in part to show details of construction of the casing.
Figure 5:
Fig. 5 is a perspective view of the eduction casing showing the ports therein and the fluidizing blade extending therefrom.

In order to remove sludge from the portion of the tank floor immediately adjacent housing 27, a spiral plow 42 is provided (see Fig. 4) which moves sludge outwardly into the path of the eduction casing 26.

In operation, tank 15 is filled with sediment carrying liquid and maintained in a quiescent equilibrium, i.e., with fresh feed entering the tank at the same rate as the total of removed sediment settling to the bottom and clarified liquid flowing over the perimetric weir 18 for discharge. The housing 27 with its eduction casing 26 and weight 30 is rotated. As the forwardly advancing front wall of the casing 26 moves into the sludge blanket 25, energy is imparted to the sludge immediately adjacent said casing wall and the sludge immediately adjacent the fluidizing blade 39, causing said sludge to behave as a fluid, and in such condition to flow along the casing and blade until it comes under the influence of the nearest of the ports 38, through which it is forced by the higher pressure existing on the outside of the casing 26. It may be noted that the size of the ports 38 decreases from the outer to inner end of the casing in order to enable each successive port to remove a greater amount of sludge as its distance from housing 27 increases. Likewise, the casing 26 is tapered to increase in diameter toward housing 27 as obviously the flow within the casing increases as each successive port adds sludge to that already flowing in the interior of the casing. The speed of rotation is selected for the characteristics of the particular sludge being removed and optimum operating speed may be determined by observing the solid content of sludge emerging from the discharge conduit 31. At the optimum condition there is no tendency for sludge to flow upwardly over the casing or to become agitated and rise upwardly in the tank. Further, a uniform layer of sludge is removed at each revolution and no settled sludge is allowed to remain in the tank long enough to become septic, or to "bulk" and tend to rise toward the surface. This is accomplished by utilizing the thixotropic characteristics of the sediment so that the fluidizing effect of the casing 26 including blade 39 governs the withdrawal of the sediment from the tank and substantially limits such withdrawal to the sediment lying directly ahead of the casing and blade.

While the foregoing description has been written generally with reference to a single eductor casing operating in a circular tank and removing activated sludge, it is to be understood, and will be obvious to those skilled in the art, that the method and apparatus of this invention are equally suitable for other arrangements of eductor casings, and other sludges which lie in a relatively heavy blanket at the bottom of a sedimentation tank, irrespective of the particular configuration of the tank.

We claim:

1. In liquid clarification apparatus, the combination with a sedimentation tank and means for introducing liquid to be clarified thereinto of a tapered sediment eduction casing movably mounted in the tank adjacent and in substantial parallelism with the floor thereof, said taper being substantially uniform and increasing the cross sectional area of the casing in the direction of sediment flow therethrough, said casing having a lower surface spaced from the bottom of the tank so that sediment is restricted therebetween and having a series of spaced ports arranged along its lower surface for the admission of the restricted sediment, said ports being spaced apart a distance substantially greater than the lengthwise dimension of the ports; a continuous, rigid fluidizing blade projecting outwardly from the casing and arranged immediately adjacent and rearwardly of the aforesaid ports with respect to the direction of motion of the casing, said blade having its lower edge adjacent, spaced from and parallel with the floor of the sedimentation tank and its upper edge in sealing relationship with the casing; means providing forward motion to the casing about a vertical axis nearer the larger end of the casing and at a rate of speed whereby sediment is fluidized at a given rate by the advancing casing and blade, and while fluid, may flow axially along the exterior of the casing and the forward wall of the fluidizing blade; and means communicating with said casing to produce a hydrostatic pressure across the ports and a total flow through the casing at said rate whereby only fluidized sediment flowing as aforesaid is educted through the ports and into and through the casing.

2. In liquid clarification apparatus, the combination with a sedimentation tank and means for introducing liquid to be clarified thereinto of a tapered sediment eduction casing movably mounted in the tank adjacent and in substantial parallelism with the floor thereof, said taper being substantially uniform and increasing the cross sectional area of the casing in the direction of sediment flow therethrough, said casing having a lower surface spaced from the bottom of the tank so that sediment is restricted therebetween and having a series of spaced ports arranged along its lower surface for the admission of restricted sediment, said ports being spaced apart a distance substantially greater than the lengthwise dimension of the ports, and increasing in area in inverse proportion to the taper of the casing; a continuous, rigid fluidizing blade projecting outwardly from the casing and arranged immediately adjacent and rearwardly of the aforesaid ports with respect to the direction of motion of the casing, said blade having its lower edge adjacent, spaced from and parallel with the floor of the sedimentation tank and its upper edge in sealing relationship with the casing; means providing forward motion to the casing about a vertical axis nearer the larger end of the casing and at a rate of speed whereby sediment is fluidized at a given rate by the advancing casing and blade, and while fluid may flow axially along the exterior of the casing and the forward wall of the fluidizing blade; and means communicating with said casing to produce a hydrostatic pressure across the ports and a total flow through the casing at said rate whereby only fluidized sediment flowing as aforesaid is educted through the ports and into and through the casing.

3. The method of uniformly withdrawing a given layer only of a thixotropic sediment blanket which method comprises moving an elongated rigid casing having spaced ports of given sizes through said layer of sediment to fluidize the portions thereof lying ahead of the casing and within the range of influence of the respective ports at rates determined by the effective areas of the casing multiplied by the velocities applicable thereto, and at the same time applying a reduced hydrostatic pressure to one end of said casing to provide calculated rates of flow through said ports which approach as near as possible said rates at which the sediment is fluidized by the casing so that the movement of the casing is effective to establish the actual flow through the ports.

4. The method of uniformly withdrawing a given layer only of a thixotropic sediment blanket which method comprises moving an elongated rigid casing having spaced ports of given sizes through said layer of sediment to fluidize the portions thereof lying ahead of the casing and within the range of influence of the respective ports at rates determined by the effective frontal areas of the casing multiplied by the velocities applicable thereto, at the same time applying a reduced hydrostatic pressure to one end of said casing to provide calculated rates of flow through adjacent ports which correspond with the rate at which the sediment is fluidized therebetween, and utilizing the casing as a channel for the flow of the fluidized sediment to each two adjacent ports in varying amounts to accommodate any variations in flow experienced by one or the other thereof.

5. In combination with a tank, apparatus for withdrawing the entire lowermost layer only of a thixotropic sediment blanket formed on the floor of the tank in a given length of time by settling out of the liquid confined within the tank, comprising a casing supported for movement within said layer and having drive means to effect one full movement of the casing in a given direction through the blanket in said given length of time, said casing having a series of ports in the forward wall thereof and means communicating with one end of the casing to produce a hydrostatic pressure differential at each of the ports to withdraw the sediment adjacent to each port, and rigid means including the forward wall of the casing and extending in proximity to the tank floor to be effective with such movement to fluidize progressively said layer of sediment lying on the tank floor ahead of said rigid means, each said port being of a size to provide a calculated rate of flow substantially equal to the rate at which the adjacent sediment is fluidized by said rigid means whereby such fluidized sediment substantially comprises the entire volume of the sediment withdrawn from the tank.

6. In combination with a tank, apparatus for withdrawing the entire lowermost layer only of a thixotropic sediment blanket formed on the floor of the tank in a given length of time by settling out of the liquid confined within the tank, comprising a casing supported for movement within said layer and having drive means connected to said casing to effect one full movement of the casing in a given direction through the blanket in said given length of time, said casing having a series of ports in the forward wall thereof and means communicating with one end of the casing to produce a hydrostatic pressure differential at each of the ports to withdraw the sediment adjacent to each port, and rigid means including the forward wall of the casing and extending in proximity to the tank floor to be effective with such movement to fluidize progressively said layer of sediment lying on the tank floor ahead of said rigid means, each said port being of a size to provide a calculated rate of flow substantially equal to the rate at which the adjacent sediment is fluidized by said rigid means, said rigid means forming a channel allowing the fluidized sediment midway between adjacent ports to flow to either thereof according to the actual flow through said adjacent ports whereby such fluidized sediment substantially comprises the entire volume of the sediment educted.

References Cited in the file of this patent

UNITED STATES PATENTS

| | | |
|---|---|---|
| 1,607,669 | Foster | Nov. 23, 1926 |
| 1,947,429 | Townsend et al. | Feb. 13, 1934 |
| 2,143,441 | Jacobs | Jan. 10, 1939 |
| 2,150,865 | Shafer | Mar. 14, 1939 |
| 2,236,128 | Poole | Mar. 25, 1941 |
| 2,263,168 | Dorr et al. | Nov. 18, 1941 |

FOREIGN PATENTS

| | | |
|---|---|---|
| 12,699 | Great Britain | of 1894 |